United States Patent
Clara

(10) Patent No.: US 8,725,473 B2
(45) Date of Patent: May 13, 2014

(54) METHOD FOR OPTIMIZING THE SETTINGS OF AN OPHTHALMIC SYSTEM

(75) Inventor: Philippe Clara, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 543 days.

(21) Appl. No.: 13/062,390

(22) PCT Filed: Sep. 4, 2009

(86) PCT No.: PCT/EP2009/061473
§ 371 (c)(1),
(2), (4) Date: Mar. 4, 2011

(87) PCT Pub. No.: WO2010/026220
PCT Pub. Date: Mar. 11, 2010

(65) Prior Publication Data
US 2011/0166834 A1 Jul. 7, 2011

(30) Foreign Application Priority Data
Sep. 4, 2008 (EP) .................................... 08305525

(51) Int. Cl.
*G06F 17/50* (2006.01)
(52) U.S. Cl.
USPC .......................................................... 703/7
(58) Field of Classification Search
USPC .......................................................... 703/7
See application file for complete search history.

(56) References Cited

U.S. PATENT DOCUMENTS

| | | | |
|---|---|---|---|
| 5,592,248 A | 1/1997 | Norton et al. | |
| 6,095,650 A | 8/2000 | Gao et al. | |
| 6,142,628 A | 11/2000 | Saigo | |
| 7,152,976 B2 | 12/2006 | Fukuma | |
| 2002/0105530 A1 | 8/2002 | Waupotitsch et al. | |
| 2003/0123026 A1 | 7/2003 | Abitbol et al. | |
| 2004/0075809 A1* | 4/2004 | Wildsmith et al. | 351/177 |
| 2005/0162419 A1* | 7/2005 | Kim et al. | 345/419 |

FOREIGN PATENT DOCUMENTS

| | | |
|---|---|---|
| JP | 06-068215 | 3/1994 |
| JP | 11-143920 | 5/1999 |
| JP | 2001-331550 | 11/2001 |
| WO | WO 01/32074 | 5/2001 |

OTHER PUBLICATIONS

Office Action dated Aug. 13, 2013 in corresponding Japanese patent application No. 2011-525561.

* cited by examiner

*Primary Examiner* — Dwin M Craig
(74) *Attorney, Agent, or Firm* — Cozen O'Connor

(57) ABSTRACT

A method implemented by computer means, for optimizing the settings of an ophthalmic system comprising an ophthalmic lens arranged to be fitted in a spectacle frame according to a given wearer, the method comprising the steps of: providing to the computer means wearer, frame and lens data comprising a 3D representation of the, respectively wearer's face, frame and lens, generating positioning data based on the wearer, frame and lens data, said positioning data comprising the respective position of the wearer face with respect to the spectacle frame associated with the ophthalmic lens, and upon a modification request, modifying the settings of the ophthalmic lens to be manufactured and fitted in the spectacle frame, so as to modify the positioning data.

14 Claims, 2 Drawing Sheets

METHOD FOR OPTIMIZING THE SETTINGS OF AN OPHTHALMIC SYSTEM

RELATED APPLICATIONS

This is a U.S. National Phase Application under 35 USC 371 of International Application PCT/EP2009/061473 filed on Sep. 4, 2009.

This application claims the priority of European application no. 08305525.1 filed Sep. 4, 2008, the entire content of which is hereby incorporated by reference.

BACKGROUND OF THE INVENTION

The present invention relates to a method, a computer system, a software and a server for optimizing the settings of an ophthalmic system comprising an ophthalmic lens fitted in a spectacle frame according to a given wearer.

Usually, a person needing to wear spectacles and having thus a prescription filled by an ophthalmologist or by another authorised eye care professional goes to the premise of an optician for choosing the frame of the future spectacles. The future wearer of the spectacles may try several spectacle frames and finally chose one of the tried frames.

Usually the optician performs measurements on the chosen spectacle frame. These measurements may be required to finalize the lens order when the lenses are to be delivered edged.

Usually, the inner circumference of the openings of the chosen spectacle frame, for example the openings of the frame where spectacle lenses are intended to be mounted, is measured very precisely by a mechanical sensor. More particularly, the openings of the frame include an inner rim and the characteristics of the rim, for example 3D shape of the rim, title angle with the opening, depth of the rim, etc., are measured by the mechanical sensor in a measuring room. The measurements performed by the mechanical sensor on the chosen frame make it possible to order ophthalmic lenses which fit the chosen frame, on the one hand and the wearer prescription, on the other hand. More particularly, according to the measurements performed by the mechanical sensor and the optician in the measuring room, the optician and/or the lens provider are able to:

specify the finishing job, for example shape and/or finishing options;
cut the edges of the lens for fitting with the mechanical measurements performed on the chosen frame; and
provide spectacle lenses adapted to the wearer prescription and the chosen frame.

The lens provider has to ensure that the providing lens will be adapted to the wearer prescription and to the chosen frame. For example, the lens provider has to ensure that the future lens can effectively be mounted on the chosen frame which may have particular openings and rims.

Therefore, usually, the lens provider takes into account the wearer prescription and the chosen frame so as to provide adapted lenses. However, it may happen that although the provided lenses correspond to the wearer prescription and perfectly fit the chosen spectacle frame, the resulting spectacles may be totally anaesthetic and generate huge client dissatisfaction.

The present invention aims to improve the situation.

SUMMARY OF THE INVENTION

One aspect of the invention relates to a method implemented by computer means, for optimizing the settings of an ophthalmic system comprising an ophthalmic lens arranged to be fitted in a spectacle frame according to a given wearer, the method comprising the steps of:

providing to the computer means wearer data comprising a 3D representation of the wearer's face,
providing to the computer means frame data comprising a 3D representation of the spectacle frame,
providing to the computer means lens data comprising a 3D representation of the ophthalmic lens,
generating positioning data based on the wearer, frame and lens data, said positioning data comprising the respective position of the wearer face with respect to the spectacle frame associated with the ophthalmic lens, and
upon a modification request, modifying the settings of the ophthalmic system so as to modify the positioning data.

Advantageously, such method makes it possible to take into consideration the 3D representation of the wearer's face when determining the settings of an ophthalmic system comprising an ophthalmic lens fitted in a spectacle frame. In particular, the relative position of the ophthalmic system and the wearer's face when the wearer is wearing the ophthalmic system can be taken into consideration when optimizing the settings of said ophthalmic system.

For example, the morphology of the wearer may be taken into consideration by the lens provider when calculating the settings of the provided lens. Indeed, depending on their morphology some wearer may have their cheek or eyebrow, more less "stick out" so that when they are wearing a given ophthalmic system, their cheek or eyebrow may comes in contact with the ophthalmic lens. Advantageously, the method according to the invention may be used to optimize the setting of the ophthalmic system so as to take into consideration the morphology of the wearer face.

According to further embodiments which can be considered alone or in combination:

the frame data further comprises a 3D representation of the groove and/or flexibility tolerance of the spectacle frame;
the method further comprises a frame data modifying step in which the frame data are modified by deforming in the limit of the flexibility tolerance said spectacle frame;
the lens data further comprises for the ophthalmic lens a 3D representation of the bevel travel and/or the base curve of the front face and/or the base curve of the rear face and/or the optical index;
before modifying the positioning data, said positioning data are displayed;
the method further comprises a selecting step in which at least one setting of the ophthalmic system which is selected so as to modify the positioning data;
the settings of the ophthalmic system comprise settings of the spectacle frame and of the ophthalmic lens;
the settings of the ophthalmic system comprise for the ophthalmic lens the finishing parameters and/or the front face design and/or the rear face design and/or the optical index;
the settings of the ophthalmic system comprise for the spectacle frame the base of the front and/or rear face of the spectacle frame.

Another aspect of the invention relates to computer means for implementing a method according to the invention, said computer means comprise processing means being adapted for associating the wearer, frame and lens data so as to generate positioning data comprising the respective position of the wearer face with respect to the spectacle frame associated with the ophthalmic lens.

Computer means according to an embodiment of the invention may further comprise display means being adapted to display the positioning data.

Another aspect of the invention relates to a software product adapted to be stored in a memory of a processor unit of a computer entity or in a removable memory medium adapted to cooperate with a reader of the processor unit of the computer entity, comprising instructions for implementing the method according to the invention.

Another aspect of the invention relates to a server comprising:
  providing means adapted to provide to computer means:
    wearer data comprising a 3D representation of the wearer's face,
    frame of data comprising a 3D representation of the spectacle frame,
    lens data comprising a 3D representation of each of the lenses of the pair of ophthalmic lenses,
  first processing means being adapted to:
    generate positioning data based on the wearer, frame and lens data, said positioning data comprising the respective position of the wearer face with respect to the spectacle frame associated with the ophthalmic lens, and
    upon a modification request, modify the settings of the ophthalmic system so as to modify the positioning data.

BRIEF DESCRIPTION OF THE DRAWINGS

Non limiting embodiments of the invention will now be described with reference to the accompanying drawings wherein.

DETAILED DESCRIPTION OF THE DRAWINGS

In the sense of the invention the finishing parameters may comprise edging and/or drilling and/or centering parameters.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus. The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Figure 1:
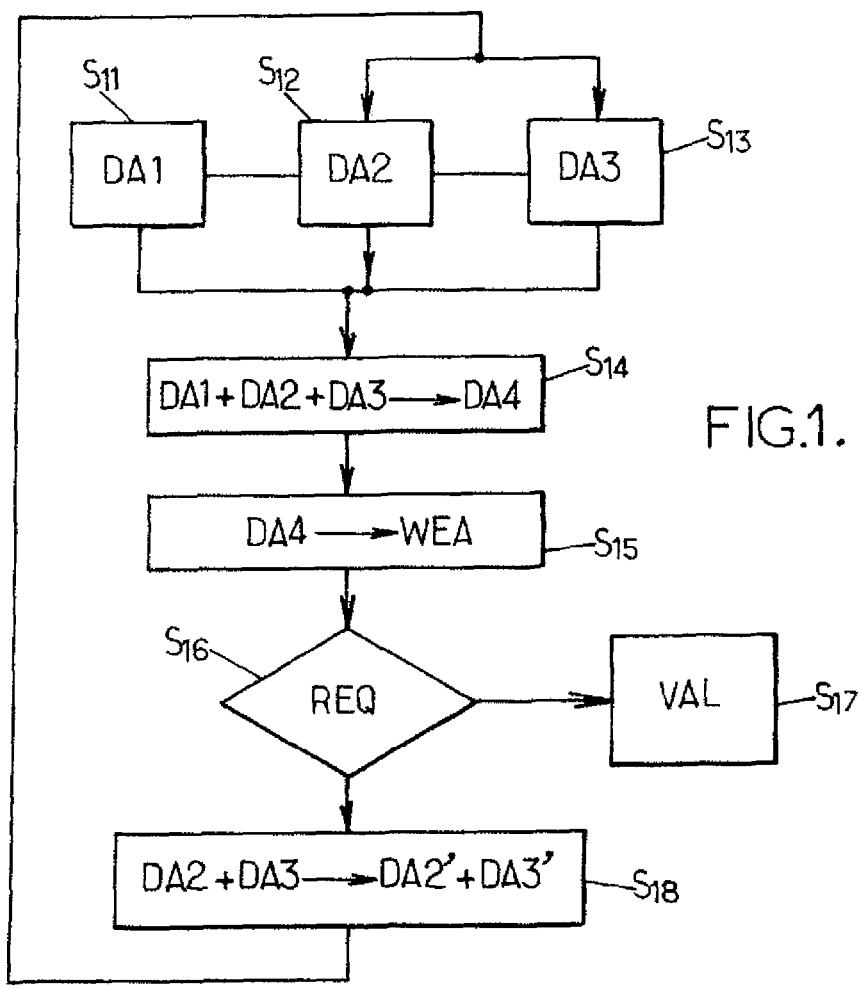
FIG. 1 is a flow chart of the steps comprised in a method according to a first embodiment of the invention.

FIG. 1 illustrates the steps of an optimizing method according to the invention.

In an embodiment of the invention, the method for optimizing the settings of an ophthalmic system comprising an ophthalmic lens fitted in a spectacle frame according to a given wearer may comprise:
  a step S11 of providing to the computer means a first set of data DA1 or wearer data comprising a 3D representation of the wearer's face,
  a step S12 of providing to the computer means a second set of data DA2 or frame data, comprising a 3D representation of the spectacle frame,
  a step S13 of providing to the computer means a third set of data DA3 comprising a 3D or lens data, representation of the ophthalmic lens,
  a step S14 of generating positioning data DA4 based on the wearer, frame and lens data, said positioning data comprising the respective position of the wearer face with respect to the spectacle frame associated with the ophthalmic lens,
  a step S15 of communicating the positioning data DA4 for example to the wearer or the optician,
  a step S16 of receiving a modification request REQ, for example from the wearer or the optician, and
  a step S17 of modifying the settings of the ophthalmic system so as to modify the positioning data DA4, for example through the frame DA2 and/or lens DA3 set of data.

According to an embodiment of the invention, the method represented in FIG. 1 may comprise a validation step S18. Indeed, when during the step S16 of receiving a modification request REQ, a no-modification request is received or not modification request is received after a given time. Then, the frame and lens data are validated trough the validation step S18.

The validation step S17 may comprise a step of sending a validation order VAL to the lens provider so as to confirm the choice of the spectacle frame and the ophthalmic lens.

Advantageously, according to the method represented on FIG. 1, the wearer or the optician may, through the modification request, modify the settings of the ophthalmic system so as to better correspond to the choice of the wearer, therefore reducing the risk of dissatisfaction of the wearer.

The settings of the ophthalmic system which may be modified during the modification step S16 may comprise the settings of the spectacle frame and/or the ophthalmic lens.

The settings of the spectacle frame may comprise for example, the curvature of the front and rear face of the spectacle frame being deformed in the limit of the flexibility tolerance of said spectacle frame.

The settings of the ophthalmic lens which may be modified may comprise the finishing parameters and/or the front face design and/or the rear face design and/or the optical index and/or additional facet and/or the 3D representation of the ophthalmic lens bevel.

According to an embodiment of the invention during the modifying step S16, the settings of the ophthalmic system are modified by first modifying the 3D representation of the bevel of the ophthalmic lens, then modifying the front and rear faces of the ophthalmic lens then modifying the curvature of the spectacle frame and finally, adding additional facets to the ophthalmic lens.

Advantageously, the inventors have observed that modifying the settings in such order reduces the number of modifications of the settings to be done so as to satisfy the wearer and/or the optician.

Figure 2:
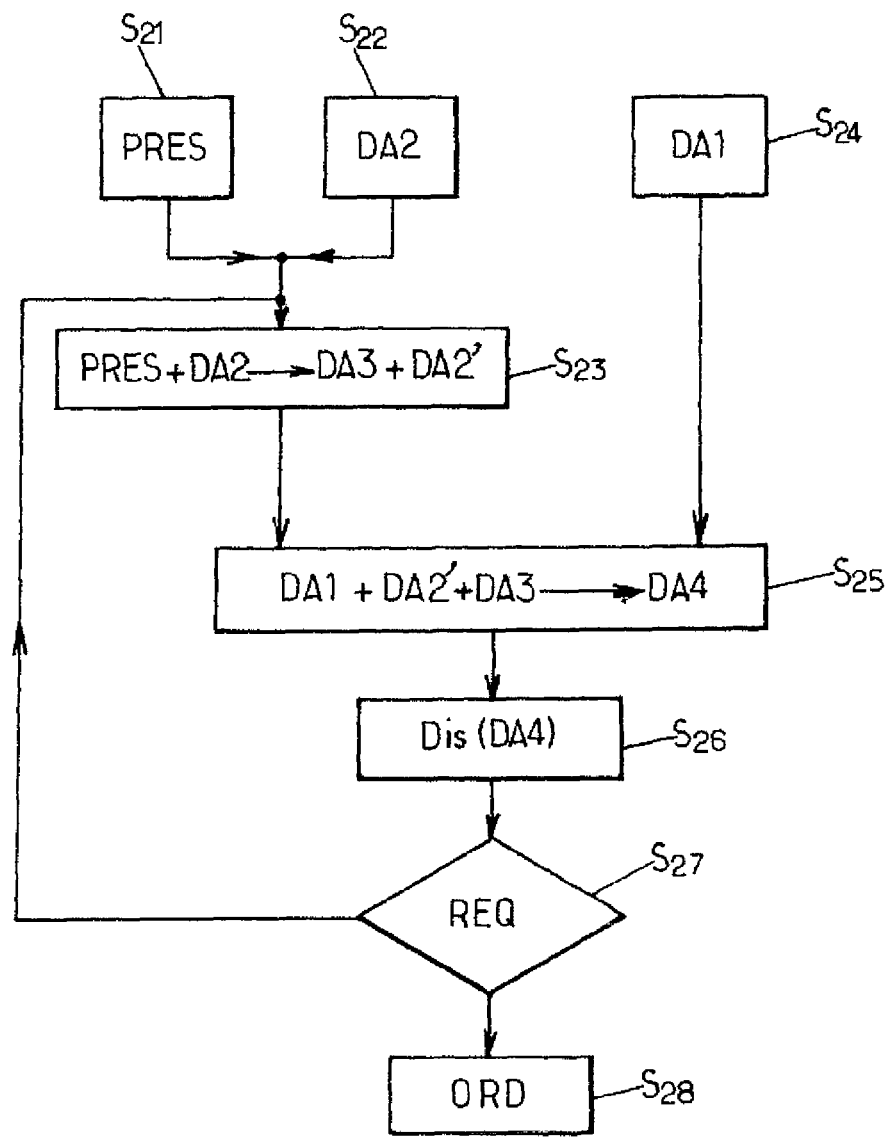
FIG. 2 is a flow chart of the steps comprised in an ordering process comprising a method according to a second embodiment of the invention.

The method for optimizing the settings of an ophthalmic system according to the invention may be used through an ordering method as illustrated in FIG. 2.

The ordering method of FIG. 2 comprises a method for optimizing the settings of an ophthalmic system according to the invention.

The wearer needing to wear spectacles and having thus a prescription filled by an ophthalmologist goes to the premise of an optician to choose the spectacle frame he wishes to wear. Once the wearer has chosen a spectacle frame, the optician determines, for example through a measuring method or using a data base, a 3D representation of the chosen spectacle frame.

The optician also determines a 3D representation of the wearer face. The 3D representation of the wearer's face may be determined through a measuring method comprising for example taking pictures of the front and side face of the wearer, or by any other means.

The ordering method illustrated on FIG. 2 comprises a step S21 of providing to first computer means the wearer prescription PRES and a step S22 of providing to said first computer means a second set of data DA2 or frame data comprising a 3D representation of the spectacle frame chosen by the wearer.

The first computer means may then generate a third set of data DA3 or lens data comprising a 3D representation of an ophthalmic lens adapted to the wearer prescription and to the chosen frame using the prescription data PRES and the second set of data DA2 or frame data.

Optionally, the processing step S23 may comprise modifying the second set of data DA2 or frame data, for example by modifying the curvature of the front or rear face of the chosen spectacle frame within the limit of flexibility tolerance of said spectacle frame.

Through step 23, the frame DA2 and lens DA3 data are provided to second computer means.

The ordering method further comprises a step S24 of providing to said second computer means a first set of data DA1 or wearer data comprising a 3D representation of the wearer's face.

The wearer, frame and lens data are associated during an associating step S25 so as to generate positioning data DA4 based on the wearer, frame and lens data, said positioning data DA4 comprising the respective position of the wearer face with respect to the spectacle frame associated with the ophthalmic lens. The positioning data may be computed so as to be displayed.

The ordering method may comprise a display step S26 wherein the positioning data DA4 are displayed, for example in the form of a 3D representation of the wearer's face wearing the spectacle frame associated with the ophthalmic lens.

Advantageously, the wearer and/or the optician may, through the display of the 3D representation of the wearer's face wearing the spectacle frame associated with the ophthalmic lens, evaluates if the proposed ophthalmic lens fulfil criteria of the wearer, for example esthetical criteria.

For example, the wearer and/or the optician may realise that when the wearer is wearing the spectacle frame associated with the ophthalmic lens, said ophthalmic lens come in contact with the wearer's face, for example, the wearer's cheek or the wearer's eyebrow.

The ordering method illustrated on FIG. 2 comprises a request step S27 wherein a modification request REQ may be received.

Upon reception of a modification request REQ, said modification request is sent to the first computer means so as to modify through step S23 the lens and/or frame data. Such modification may modify the settings of the spectacle frame and/or of the ophthalmic lens. Such settings may be modified as explained in accordance to the first embodiment of the method according to the invention.

When no modification request is received or when a no-modification request is received through step S27, the ordering method further comprises an ordering step S28 wherein the order ORD is sent to the lens provider. Such order ORD may be in the form of a simple validation of the proposed ophthalmic lens.

Figure 3:
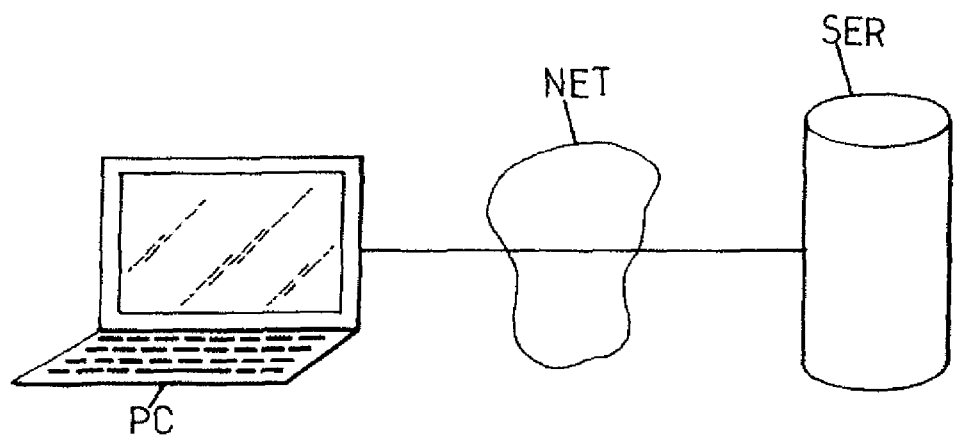
FIG. 3 schematically shows an example of computer means adapted to implement a method according to the invention.

As illustrated on FIG. 3, the first computer means may be implemented in a server SER at the lens provider side. The server being link via a network NET to second computer means implemented in a computer entity PC at the optician side.

The computer entity PC may comprise a screen or any other display means adapted to display the positioning data DA4.

Advantageously, the display of the positioning data DA4 can be accessed by:
  the authorized optician or any eye care professional providing the spectacles, of course, in order to judge whether the displayed simulation result of the lenses mounted on the chosen frame worn by the future wearer is satisfactory,
  the future wearer himself, or
  the lens or the frame provider, for example in order to archive a database with the results of lens types mounted on frame types.

The display of the positioning data can be a short computer program (or "applet") that can be accessed, for example, through a link (an "url" for example) of a website page of the optician or eye care professional. An identification procedure requiring the entry of a correct identification code may be implemented for downloading the applet.

Other arrangements of the computer means are possible. For example, the first and second computer means may be implemented in a computer entity on the optician side.

The invention has been described above with the aid of embodiment without limitation of the general inventive concept.

The invention claimed is:

1. A computerized method for optimizing the settings of an ophthalmic system comprising an ophthalmic lens arranged to be fitted in a spectacle frame according to a given wearer, the method comprising the steps of:
  the computer receiving wearer data comprising a 3D representation of the wearer's face;
  the computer receiving frame data comprising a 3D representation of the spectacle frame;

the computer receiving lens data comprising a 3D representation of the ophthalmic lens;

generating positioning data based on the wearer, frame and lens data, said positioning data comprising the respective position of the wearer face with respect to the spectacle frame associated with the ophthalmic lens; and upon a modification request, modifying the settings of the ophthalmic lens to be manufactured and fitted in the spectacle frame, so as to modify the positioning data, wherein modifying the settings of the ophthalmic lens comprises the following subsequent steps:

modifying the 3D representation of a bevel of the ophthalmic lens;

modifying the front and rear faces of the ophthalmic lens;

modifying the curvature of the spectacle frame; and adding additional facets to the ophthalmic lens.

2. The method according to claim 1, wherein the frame data further comprises a 3D representation of the groove and/or flexibility tolerance of the spectacle frame.

3. The method according to claim 2, further comprising modifying the frame data by deforming in the limit of the flexibility tolerance said spectacle frame.

4. The method according to claim 1, wherein the lens data further comprises for the ophthalmic lens a 3D representation of the bevel travel and/or the base curve of the front face and/or the base curve of the rear face and/or the optical index.

5. The method according to claim 1, wherein before modifying the positioning data, said positioning data are displayed.

6. The method according to claim 5, wherein the method further comprises selecting at least one setting of the ophthalmic system so as to modify the positioning data.

7. The method according to claim 1, wherein said settings of the ophthalmic system comprise for the ophthalmic lens the finishing parameters and/or the front face design and/or the rear face design and/or the optical index.

8. The method according to claim 1, wherein said settings of the ophthalmic system further comprise the base of the front and/or rear face of the spectacle frame.

9. Computer means for implementing the method according to claim 1, comprising processing means for associating the wearer, frame and lens data so as to generate positioning data comprising the respective position of the wearer face with respect to the spectacle frame associated with the ophthalmic lens.

10. The computer means according to claim 8, further comprising display means for displaying the positioning data.

11. A server for implementing the method according to claim 1, comprising:

means for providing the computer means with the following data:

wearer data comprising a 3D representation of the wearer's face, frame data comprising a 3D representation of the spectacle frame, and lens data comprising a 3D representation of each of the lenses of the pair of ophthalmic lenses; and first processing means for:

generating positioning data based on the wearer, frame and lens data, said positioning data comprising the respective position of the wearer face with respect to the spectacle frame associated with the ophthalmic lens, and upon a modification request, modifying the settings of the ophthalmic lens to be manufactured and fitted in the spectacle frame, so as to modify the positioning data, wherein modifying the settings of the ophthalmic lens comprises the following subsequent steps:

modifying the 3D representation of a bevel of the ophthalmic lens;

modifying the front and rear faces of the ophthalmic lens;

modifying the curvature of the spectacle frame; and adding additional facets to the ophthalmic lens.

12. The method of claim 1, implemented as computer executable instructions stored on a non-transitory computer readable storage medium.

13. A computerized method for optimizing the settings of an ophthalmic system comprising an ophthalmic lens arranged to be fitted in a spectacle frame according to a given wearer, the method comprising the steps of:

the computer receiving wearer data comprising a 3D representation of the wearer's face;

the computer receiving frame data comprising a 3D representation of the spectacle frame;

the computer receiving lens data comprising a 3D representation of the ophthalmic lens;

generating positioning data based on the wearer, frame and lens data, said positioning data comprising the respective position of the wearer face with respect to the spectacle frame associated with the ophthalmic lens; and upon a modification request, modifying the settings of the ophthalmic lens to be manufactured and fitted in the spectacle frame, so as to modify the positioning data, wherein the lens data further comprises for the ophthalmic lens a 3D representation of the bevel travel and/or the base curve of the front face and/or the base curve of the rear face and/or the optical index.

14. The method of claim 13, implemented as computer executable instructions stored on a non-transitory computer readable storage medium.

* * * * *